Jan. 16, 1962   G. E. KELLOGG ET AL   3,016,880
DIAPHRAGM BRAKE BOOSTER

Filed Aug. 30, 1960   2 Sheets-Sheet 1

INVENTORS
George E. Kellogg
William V. Kenzik
BY
Their Attorney

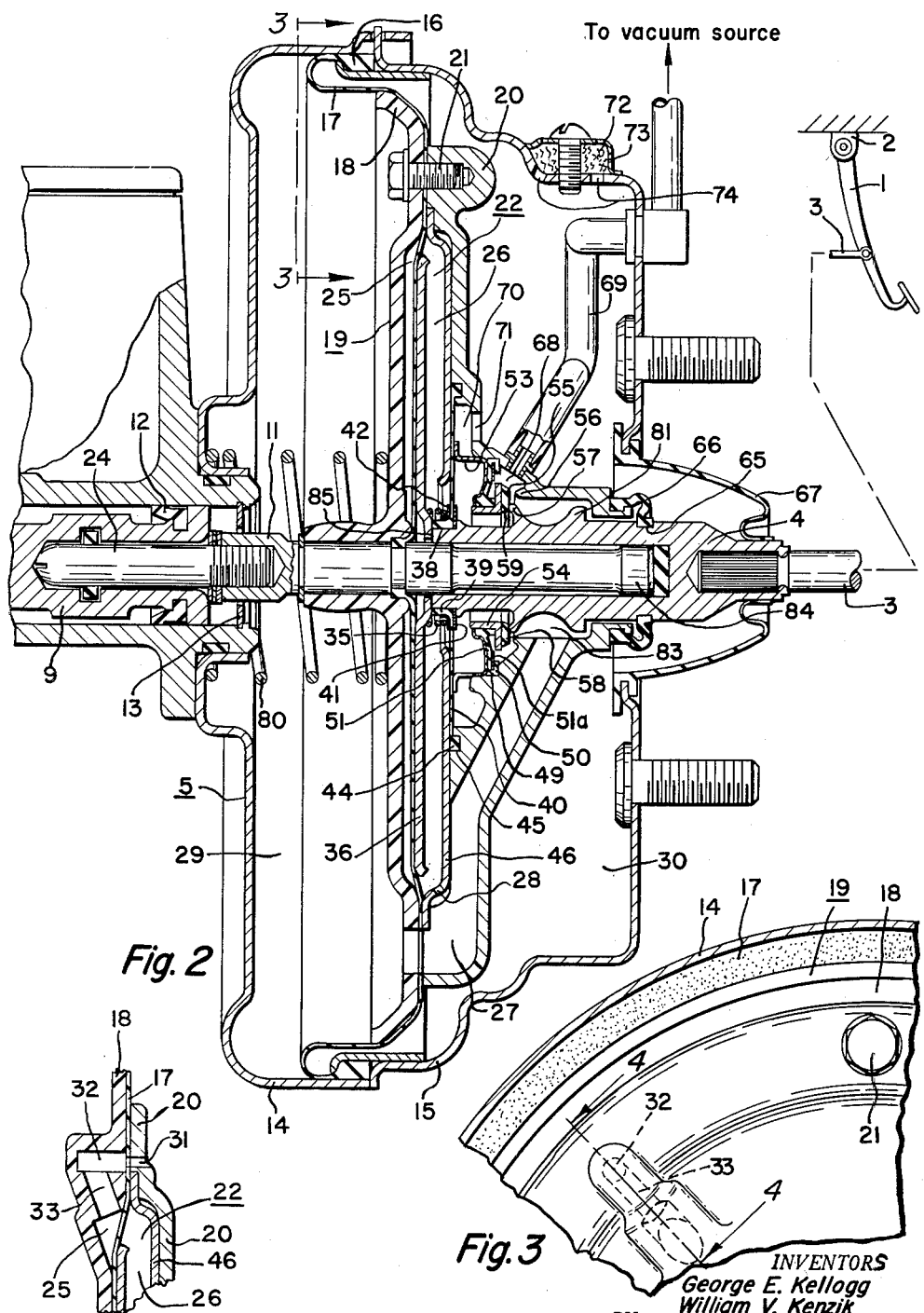

United States Patent Office 3,016,880
Patented Jan. 16, 1962

3,016,880
DIAPHRAGM BRAKE BOOSTER
George E. Kellogg, Miamisburg, and William V. Kenzik, Dayton, Ohio, assignors to General Motors Corporation, Detroit, Mich., a corporation of Delaware
Filed Aug. 30, 1960, Ser. No. 52,825
8 Claims. (Cl. 121—41)

This invention relates to a brake booster and more particularly to a diaphragm forming the power wall seal as well as transmitting a reaction means.

This invention is intended to employ a diaphragm in combination with the power wall wherein the diaphragm extends radially inward to form a reaction means in direct response to the degree of power operation. The diaphragm operates within a reaction chamber and transmits a reaction force to the manual control means. The reaction operates in direct response to the operation of the valve means controlling the booster unit and provides a reaction to the manually operated means.

It is an object of this invention to provide an air reaction chamber in the power wall operating in direct response to the degree of power operation of the booster unit.

It is another object of this invention to provide a single diaphragm providing a seal on the outer periphery of the power wall and also forming a means for transmitting reaction within a reaction chamber of the power wall operating in direct proportion to the degree of power operation of the booster unit.

It is a further object of this invention to provide a single diaphragm for flexing in combination with the power wall for power operation of the booster unit and a central portion of said diaphragm to flex within a reaction chamber to provide reaction means transmitted to the manually controlled means.

The objects of this invention are accomplished by employing a rolling diaphragm which forms a bead on its outer periphery which is sealed between the forward and the rear sections of the power unit. The adjacent portion of the diaphragm forms a substantially cylindrical portion having an axis substantially coincidental with the axis of the booster unit to provide a flexing means. Adjoining the flexing portion the diaphragm is retained within the rigid portion of the power wall. The radially inner portion also forms a bead which is sealed on a push rod which is connected to the master piston. The bead forming the seal on the push rod is adjoined by an intermediate flexing portion extending through a diaphragm reaction chamber. The diaphragm separates the intermediate portion of the reaction chamber into a variable pressure chamber and a constant air pressure chamber.

The power wall per se separates the interior portion of the booster unit into a constant pressure chamber and a variable pressure chamber. The variable pressure chamber is in direct communication with the variable pressure chamber of the reaction chamber of the booster unit. The constant pressure chamber in the reaction chamber is also in communication with the constant pressure chamber of the booster unit.

Concentric air and vacuum valves are positioned within a portion of a power wall. The air valves and the vacuum valves are operated manually and control the degree of evacuation on the forward side of the power wall. The evacuation of the variable pressure chamber in the booster unit also evacuates the variable pressure within the reaction compartment.

In this manner the reaction transmitted through the push rod to the air valve and the manually controlled means is in direct proportion to the degree of evacuation of the booster unit which, in turn, controls the degree of power operation of the booster unit. It can be readily seen that the power diaphragm provides dual function in sealing and flexing on the outer periphery of the power wall as well as the flexing portion for transmitting the reaction means to the manually controlled means for the booster unit.

Further objects and advantages of the present invention will be apparent from the following description, reference being had to the accompanying drawings wherein preferred embodiments of the present invention are clearly shown.

In the drawings:

FIGURE 1 is a cross section of the booster unit showing the reaction means and the power wall in combination with the booster unit. The air valve is in the normally retracted or open position and the vacuum valve is closed.

FIGURE 2 is a similar cross section to that of FIGURE 1 except the air valve is closed and the vacuum valve is open and the flexing portions of the diaphragm are shown in the flexed position wherein the power wall is moved slightly forward and the flexing portion in the reaction compartment is shown in the intermediate portion of the reaction compartment transmitting a force to the manually controlled means.

FIGURE 3 is a fragmentary section taken on line 3—3 of FIGURE 2.

FIGURE 4 is a fragmentary cross section view taken on line 4—4 of FIGURE 3.

Figure 1:
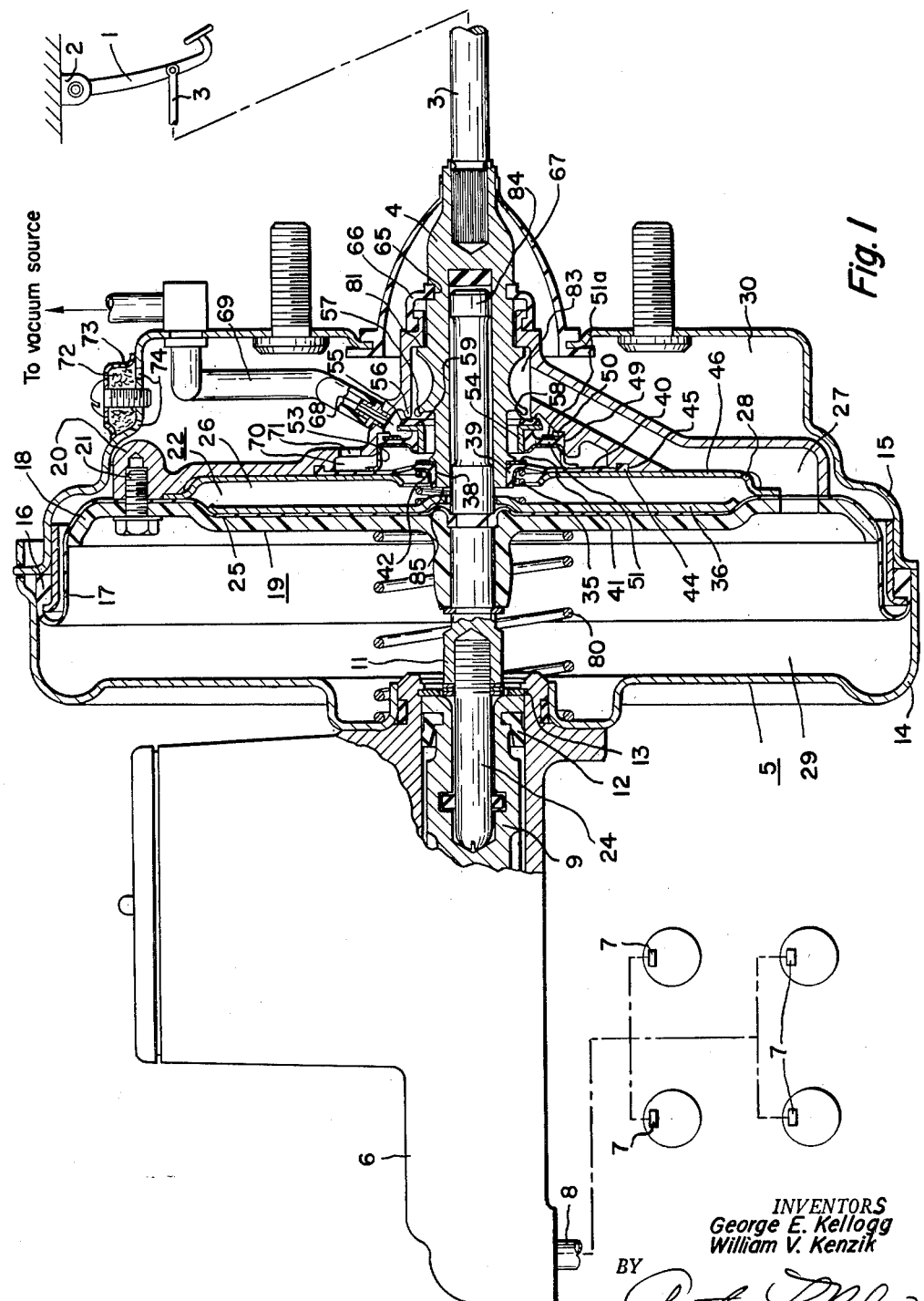

The brake pedal 1 is pivotally mounted on the chassis 2. The brake pedal 1 is also pivotally connected to the push rod 3 which is seated in a central opening in the rear end of the air valve 4.

The booster unit 5 operates to pressurize fluid within the master cylinder 6 which is adapted for connection to a plurality of wheel cylinders 7 through the conduit means 8. The rearward end of the master piston 9 receives the forward end of a push rod 11. The rearward end of the piston 9 is provided with a seal 12 and a snap ring 13 which provides a stop for the piston.

The booster unit 5 includes a forward casing section 14 and a rearward casing section 15 which enclose the booster unit. The forward section 14 and the rearward section 15 form a seal on the peripheral bead 16 of the diaphragm 17. The diaphgram 17 extends radially inward to form the flexing portion lying in a generally cylindrical shape when the booster unit is in its retracted position. The flexing portion of the diaphragm lies on a contour formed by the diaphragm support member 18 of the power wall 19. The valve housing 20 is fastened to the diaphragm support 18 by a plurality of screws 21. The screws 21 rigidly fasten the two sections 18 and 20 of the power wall to form a seal on the diaphragm 17.

The diaphragm 17 extends radially inward into a reaction compartment 22. The diaphragm 17 extends from the radial outer edge of the compartment 22 to the radial inner edge of the compartment. The push rod 11 extends centrally through the reaction compartment 22 and has a stud bolt 24 in the forward end which engages the rear end of the master piston 9.

Referring to FIGURE 2, the central portion of the diaphragm 17 also forms a flexing portion of the diaphragm extending through the intermediate portion of the reaction compartment 22. The diaphragm 17 defines a constant pressure cavity 25 forward of the diaphragm and a variable pressure cavity 26 rearward of the diaphragm.

The variable pressure cavity 26 is in communication with the passage 27 through a port 28 providing passage between the variable pressure cavity 26 and the passage 27 leading from the valve assembly to the variable pressure chamber 29 on the forward side of the power wall 19.

The constant pressure cavity 25 is in communication with the constant pressure chamber 30 rearward of the power wall 19. Referring to FIGURE 3, a raised portion containing a passage means is shown on the forward side of the power wall 19.

FIGURE 4 shows the passages 31, 32 and 33 which lead from the rearward side of the power wall into the constant pressure chamber 30. The size of the passages 31, 32 and 33 which lead to the constant pressure cavity 25 on the forward side of the diaphragm 17 within the reaction compartment, controls the reaction delay on the diaphragm 17. The constant pressure cavity 25 changes in volume in response to the pressure within the variable pressure cavity 26. When a vacuum is present within the variable cavity 26, the flexing portion of the diaphragm 17 within the reaction compartment 22 is biased to a rearward position in spaced relation from the diaphragm support 18. This position is shown in FIGURE 2.

FIGURE 1 indicates the position in which the pressure on the forward and the rearward side are equal or being at atmospheric pressure and in this position the spring 35 biases the reaction plate 36 to a forward position deflating the constant pressure cavity 25 forward of the diaphragm 17.

The air valve 4 extends forwardly within the booster unit and is provided with an annular recess 38 to receive the bead 39 of the air valve diaphragm 40. The air valve diaphragm 40 seats against the annulus 41 on its rearward side and is retained in its position by the ring 42.

The outer periphery of the air valve diaphragm 40 forms a peripheral seal 44 which is received in a recess 45 of the valve housing 20. An annular disk 46 abuts the forward side of the valve housing 20 and permanently seats the bead 44 within the recess 45 to form a seal within the valve housing 20.

The valve housing 20 forms an annular recess 49 for the reception of a peripheral bead 50 on the valve seat diaphragm 51. An annulus 51 is received on the rearward side in the peripheral bead 50 of the valve seat diaphragm 51 and a retainer spring 53 seats on the forward side of the valve seat diaphragm 51 and forms a spring to bias the valve seat member 54 in a rearward position. The valve seat member 54 provides a mounting for an annulus 55 forming the air valve and the vacuum valve seat on a common planar surface. The valve housing 20 forms an annular ridge 56 which operates as the vacuum valve element. A similar concentric ridge 57 is formed on the outer periphery of the air valve 4 forming the air valve element for contacting the air valve seat 59 on the annulus 55. The air valve seat 59 and the vacuum valve seat 58 are concentric with each other and formed on the common planar surface of the annulus 55.

The air valve 4 extends rearwardly and has an annular recess 65 formed thereon for reception of the boot 66. A second boot 67 is also mounted on the rearward end of the air valve 4 and engages the inner periphery of the rear booster unit casing section 15. The vacuum compartment 68 is in communication with the vacuum conduit 69 to a source of vacuum. The air compartment 70 is in communication with the air chamber 30 through the passage 71. The air chamber 30 is in communication with the atmosphere through the filter 72 and the passages 73 and 74.

The booster unit in its retracted position is illustrated in FIGURE 1 where the power wall 19 is biased rearwardly by the spring 80. The power wall 19 abuts the rearward section 15 of the booster unit casing. The air chamber 30 in this position is at minimum volume and the variable pressure chamber 29 is at maximum volume.

The reaction compartment 22 within the power wall contains the constant pressure cavity 25 and the variable pressure cavity 26. The constant pressure cavity 25 is in direct communication with the air pressure compartment 30 of the booster unit and the spring 35 biases the reaction plate 36 forwardly so that the cavity 25 is at minimum volume in this position. The variable pressure chamber 26 within the power wall 19 is at maximum volume in this position. The reaction plate 36 is biased forwardly in response to the action of the spring 35 and the air valve 4 is biased rearwardly in response to the same spring action. The air valve 4 in this position, having a shoulder 81, seats on a mating shoulder of the valve housing 20 in its retracted position. In the retracted position, the annular ridge 57 formed on the outer periphery of the valve 4 is in spaced relation to the annulus 55 forming the air valve seat 58 on the valve seat member. The air valve 4 being in spaced relation to the air valve seat permits the biasing force of the annular spring formed by the retainer 53 to bias the valve seat member 54 to a rearward position wherein the annulus 55 is contacting the peripheral ridge 56 of the valve housing 20. In this position the vacuum compartment 68 is no longer in communication with the variable pressure chamber 29 forward of the power wall 19.

As the brake pedal 1 is depressed, the push rod 3 moves axially forward carrying the air valve 4 forwardly contacting the mating air valve seat 58 on the annulus 55. Continued forward movement of the air valve 4 firmly seats the ridge 57 on the air valve seat 58 and unseats the annular ridge 56 of the valve housing 20 from the vacuum valve seat 58. This places communication between the vacuum compartment 68 within the valve housing 20 and the passages 83 and 27 leading to the forward side of the power wall 19 and the variable pressure chamber 29. With evacuation of chamber 29 on the forward side of the power wall 19 the power wall moves forwardly unfolding the flexing portion of the diaphragm 17 against the inner periphery of the forward section 14 of the booster unit casing. This action causes a power movement of the master piston 9 within the master cylinder 6.

The passage 27 leading to the forward side of the power wall 19 is in communication with the variable pressure cavity 26 within the reaction compartment 22. The evacuation of the variable pressure cavity 26 is accomplished simultaneously with the evacuation of the variable pressure chamber 29 within the booster unit. This causes a rearward movement of the reaction plate 36 as the air pressure in the cavity 25 forward of the diaphragm 17 within the power wall is at a constant pressure. The constant pressure cavity 25 is at atmospheric pressure. The air at constant pressure in chamber 30 feeds through the passages 31, 32 and 33 to the cavity 25. The increase in volume in the constant pressure cavity 25 and the decrease in volume in the variable pressure cavity 26 within the reaction compartment 22 causes a rearward relative movement of the reaction plate 36 within the reaction compartment 22. The size of the passages 31, 32 and 33 controls the rate of relative movement at the reaction plate 36. The radially inner periphery of the reaction plate 36 contacts the forward facing 85 of the air valve 4, thereby transmitting a reaction force to the air valve and the manually operated means. The transmission of force is in direct proportion to the evacuation of the variable pressure cavity 26 in the reaction compartment 22. The further forward movement of the air valve 4 encounters the reaction force transmitted to the reaction plate 36 by the evacuation within the cavity 26 of the power wall. With the increased evacuation in the variable pressure chamber 29 forward of the power wall 19, the reaction transmitted through the reaction plate 36 is in direct proportion to this evacuation. The greater the vacuum within the variable pressure chamber 29, the greater the actuating force for pressurizing hydraulic fluid within the master cylinder 6.

As the brake pedal 1 is slowly released, the spring 80 biases the power wall 19 rearwardly and the air valve 4 is biased rearwardly in response to the biasing force of the spring 35. As the air valve 4 moves rearwardly, the annulus 55 again contacts the peripheral ridge 56 on the valve housing 20. With the annulus 55 contacting the vacuum valve element 56 and the peripheral ridge 57 on the air valve, the brake booster is in the hold position. In this position there is no change in the pressure of the variable pressure compartment 29 within the booster unit and the variable pressure cavity 26 within the reaction compartment 22. The reaction transmitted to the manually operating means is constant in this position and the power transmitted to the pressurization of hydraulic fluid within the master cylinder 6 is also constant.

With a further retraction of the brake pedal 1, the air valve 4 moves rearwardly and the power wall 19 also moves rearwardly. The air valve 4 moves rearward due to the biasing force of the spring 35 thereby firmly seating the annulus 55 on the vacuum valve element 56. The air valve element 57 moves in spaced relation to the annulus 55, thereby opening the air valve and permitting air to enter the variable pressure compartment 29 in the booster unit and the variable pressure cavity 26 in the reaction chamber 22. The power wall moves rearwardly to its normally retracted position contacting the forward side of the section 15 of the booster unit casing. The annular spring 53 biases the valve seat diaphragm 51 rearwardly so the annulus 55 firmly seats on the annular ridge 56 forming the vacuum valve element. The spring 35 biases the air valve 4 rearwardly so the annular ridge 57 is in spaced relation to the annulus 55 forming an open position for the air valve. The spring 35 biases the reaction plate 36 to a forward position decreasing the volume of the constant pressure cavity 25 within the air reaction compartment 22. The variable pressure cavity 26 within the reaction compartment 22 increases to its maximum volume and the differential pressure chamber 29 forward of the power wall 19 increases in volume to its maximum volume as the power wall 19 returns to its retracted position.

It can be readily seen from the operation of the booster unit that the reaction transmitted by the reaction plate 36 to the air valve 4 is in direct proportion to the degree of coactuation in the variable pressure chamber 29 of the booster unit and the variable pressure cavity 26, in the reaction compartment 22. This reaction is transmitted upon operation of the air valve and vacuum valve. Upon evacuation of the chamber 29, the cavity 26 is also evacuated as the two chambers are in constant communication with each other.

The spring 35 creates a slight biasing force between the reaction plate 35 and the air valve 4 when the brake booster is in the off position. This spring creates a biasing force between these two members at all times and deflates the cavity 25 forward of the diaphragm 17 into reaction compartment 22. The diaphragm 17 provides the flexing portion to permit forward movement of the power wall 19 during power operation. The diaphragm also has a flexing radially inner portion to permit the reaction force being transmitted from the reaction plate to the air valve 4. It can be seen that the diaphragm 17 provides a combination function in providing a direct relationship of the reaction force transmitted to the manually operated member in direct proportion to the operation of the power wall. This provides a simplification of the power wall structure in an expansible fluid type booster unit.

While the embodiments of the present invention as herein disclosed constitute preferred forms, it is to be understood that other forms might be adopted.

What is claimed is as follows:

1. A brake booster unit comprising, in combination, a forward section of a booster unit, a rearward section of a booster unit, a power wall within said booster unit, a rolling diaphragm having a peripheral bead for reception between said forward and said rearward section of said booster unit casing to provide a permanent seal, a central diaphragm support member in said power wall, said power wall including a reaction compartment, said diaphragm extending through the intermediate portion of said reaction compartment to form a constant pressure cavity and a variable pressure cavity, said power wall separating the interior portion of said booster unit into a variable pressure chamber and a constant pressure chamber, said variable pressure chamber in communication with said variable pressure cavity in said reaction compartment, said constant pressure cavity in said reaction compartment in communication with said constant pressure chamber, valve means contained within said power wall for controlling the evacuation in said variable pressure chamber and said variable pressure cavity to provide power operation of said booster unit and transmit reaction in proportion to the degree of power operation of said booster unit.

2. A brake booster unit comprising, in combination, a a booster unit casing including a forward and a rearward section, a power wall including a rolling diaphragm, a peripheral bead formed on said rolling diaphragm for reception between said forward and said rearward sections of said booster unit casing to provide a positive seal, a central support member in said power wall adapted for doing work, a reaction compartment formed within said power wall and receiving said diaphragm in the intermediate portion of said reaction compartment to form a constant pressure cavity and a variable pressure cavity, an inner peripheral bead forming a seal on said central support member to seal said variable pressure cavity and said constant pressure cavity in said reaction compartment, said power wall forming a variable pressure chamber and a constant pressure chamber, said constant pressure chamber in constant communication with said constant pressure cavity within said reaction compartment, said variable pressure chamber in constant communication with said variable pressure cavity of said reaction compartment, valve means contained within said power wall adapted for manual operation for controlling the operation of said booster unit, said diaphragm providing a reaction force from said variable pressure cavity of said reaction compartment transmitted to said central support member in direct proportion to the degree of power operation of said booster unit.

3. A brake unit comprising, in combination, a booster unit including a forward and a rearward booster unit casing, a power wall including a rolling diaphragm, a peripheral bead formed in the outer periphery of said rolling diaphragm for reception in said casing to form a seal between the forward and the rearward section of said booster unit, a reaction compartment within said power wall and receiving the radially inner portion of said diaphragm, a radially inner peripheral bead forming a seal with a central support member, said central support member adapted for doing work, said diaphragm extending through the intermediate portion of said compartment to form a constant pressure cavity and a variable pressure cavity, said power wall forming in the interior portion of said booster unit a variable pressure chamber and a constant pressure pressure chamber, said variable pressure chamber in constant communication with said variable pressure cavity in said reaction compartment, said constant pressure chamber in constant communication with said constant pressure cavity of said reaction compartment, a valve means contained in said power wall and adapted for manual operation, said valve means controlling the evacuation of said variable pressure chamber and the degree of pressurization in said variable pressure cavity of said reaction compartment thereby transmitting a reaction force to the manually operated central support member in direct proportion to the degree of operation of said booster unit when said unit is in operation.

4. A brake booster unit comprising, in combination, a casing member enclosing said booster unit, a power wall separating the interior portion of said booster unit in a variable pressure chamber and a constant pressure chamber, a diaphragm having a peripheral bead sealed in said casing of said booster unit, the inner periphery of said diaphragm extending radially inward to form a seal on a central support member, said central support member adapted for fluid displacement and manual operation, said power wall including a reaction compartment for reception of said diaphragm through the inner intermediate portion of said compartment forming a variable pressure cavity and a constant pressure cavity, said constant pressure cavity in continual communication with said constant pressure chamber in said booster unit, said variable pressure cavity in said reaction compartment in communication with said variable pressure chamber, a reaction plate contacting the rearward surface of the inner periphery of said diaphragm forming a means for transmitting the reaction force to said central support member, valve means within said power wall including an air valve concentrically located within said power wall, said air valve having a radial facing on its forward side for engaging said reaction plate for receiving a reaction force and transmitting a force to said manually operated member in direct response to the decrease in pressurization in said variable pressure cavity of said reaction compartment and said vacuum chamber of said booster unit when said booster unit is in operation.

5. In a brake booster unit comprising in combination, a booster unit casing, a power wall separating the interior portion of said booster unit in a variable pressure chamber and a constant pressure chamber, a rolling diaphragm operating in cooperation with said power wall, a peripheral bead formed on the outer periphery of said diaphragm for sealing with said casing, a central support member extending centrally through said power wall, an inner peripheral bead sealed on said central support member, a reaction compartment receiving said diaphragm through the intermediate portion of said compartment forming a variable pressure cavity and a constant pressure cavity, a reaction plate concentrically located within said reaction compartment and abutting the rearward surface of said diaphragm for transmitting a reaction force to said central support member, said constant pressure chamber in said booster unit being in constant communication with said constant pressure cavity of said reaction compartment, said variable pressure chamber of said booster unit in constant communication with said variable pressure cavity of said reaction compartment, valve means centrally located within said power wall and adapted for manual operation for controlling the operation of said booster unit and receiving a reaction force from said reaction plate in direct proportion to the degree of evacuation of said variable pressure chamber and the degree of decrease in pressure in said variable pressure cavity of said power wall when said booster unit is actuated.

6. A booster unit comprising, in combination, a booster unit casing, a power wall located within said booster unit and separating the interior portion of said booster unit in a variable pressure chamber and a constant pressure chamber, a reaction compartment in said power wall, a rolling diaphragm operating in cooperation with said power wall, a peripheral bead formed on the outer periphery of said diaphragm forming a seal with said casing, a central portion of said power wall formed of a rigid support means, a central support member extending forwardly from said central portion of said power wall adapted for pressurizing fluid in a fluid displacement member and adapted for manual operation, a flexing portion of said diaphragm extending radially inward from said peripheral bead to form a cylindrical portion when said power wall is in the retracted position the axis of said cylindrical portion being essentially coincidental with the axis of said booster unit, said power wall receiving the radially inner portion of said diaphragm through the intermediate portion of said reaction compartment to form a variable pressure cavity and a constant pressure cavity, said constant pressure cavity being in communication with said constant pressure chamber of said booster unit, said variable pressure cavity of said reaction compartment being in communication with said variable pressure chamber of said booster unit, a valve means within said power wall adapted for operation by said manual means, said valve means controlling the operation of said booster unit and including an air valve having a radial facing on the forward side for engagement with a reaction member, said reaction member positioned adjacent to the intermediate portion of the diaphragm to transmit a reaction force to said air valve when said booster unit is in operation, the reaction force being in direct proportion to the degree of decrease of pressure in said variable pressure cavity and said variable pressure chamber of said booster unit when said booster unit is in operation.

7. A brake booster unit comprising in combination, a booster unit casing, a power wall located within said booster unit casing and forming a variable pressure chamber and a constant pressure chamber, a rolling diaphragm sealed on its outer periphery by said casing and extending radially inward to a rigid portion of said power wall, a flexing rolling portion of said diaphragm forming a cylindrical shape when said power wall is in its retracted position with the axis of said cylindrical portion of said diaphragm substantially coincidental with the axis of said booster unit, a reaction compartment formed in said power wall for reception of the central portion of said diaphragm to form a variable pressure cavity and a constant pressure cavity, said constant pressure cavity in communication with said constant pressure chamber of said booster unit, said variable pressure chamber in communication with said variable pressure cavity of said reaction compartment, a valve means located concentrically within said power wall including an air valve member adapted for manual operation, a second diaphragm sealed on the outer periphery and forward end of said air valve to permit axial movement of said air valve to decrease the volume of said reaction compartment upon forward movement of said air valve, a third diaphragm sealed on its outer periphery by said power wall and on its inner periphery by a valve seat member, said valve seat member having seating means for a vacuum valve and said air valve, a reaction plate concentrically located within said reaction compartment to transmit a reaction force to said air valve in direct proportion to the degree of decrease in pressure of said variable pressure cavity and said variable pressure chamber of said booster unit when said booster unit is in operation.

8. In a brake booster unit comprising, in combination, a booster unit having a casing, a power wall operating within said booster unit and separating the interior portion of said booster unit in a variable pressure chamber and constant pressure chamber, a rolling diaphragm operating in combination with said power wall and having a peripheral bead, said peripheral bead sealed by said casing of said booster unit, a rigid portion of said power wall adjoining the radially inner portion of said diaphragm, an intermediate portion between said peripheral bead and the sealed portion in said rigid portion of said power wall having a flexing portion to form a cylindrical shape when said power wall is in its retracted position with the axis of said cylindrical portion of said diaphragm being substantially coincidental with the axis of said booster unit when said power wall is in its retracted position, a reaction compartment formed within said power wall, a central support member extending concentrically through said power wall adapted for fluid displacement and manual operation, said diaphragm extending through the intermediate portion of said reaction compartment to form a variable pressure cavity and a constant pressure cavity, said constant pressure cavity in communication with the constant pressure chamber of said booster unit, said variable pressure cavity in communication with said variable pressure chamber of said booster unit, a valve means including an air valve adapted for manual operation, the forward end of said air valve adapted for reception of a second diaphragm to permit axial flexing movement of said air valve relative to said power wall, said air valve having a radial face on its forward side for engaging a reaction plate concentrically located within said reaction compartment, said reaction plate transmitting a force to said air valve in direct proportion to the degree of evacuation of said variable pressure chamber during operation of said booster unit when said unit is in operation.

References Cited in the file of this patent

UNITED STATES PATENTS

| | | |
|---|---|---|
| 2,818,710 | Price | Jan. 7, 1958 |
| 2,822,782 | Hupp | Feb. 11, 1958 |
| 2,842,101 | Price | July 8, 1958 |
| 2,876,627 | Ayers | Mar. 10, 1959 |
| 2,953,120 | Ayers | Sept. 20, 1960 |